July 9, 1968 J. L. VON FELDT 3,392,290

BISTABLE DEVICE EMPLOYING TRANSISTORS OF COMPLEMENTARY TYPES

Filed July 21, 1965

INVENTOR
JOHN L. VON FELDT

BY John C Black

ATTORNEY

United States Patent Office 3,392,290
Patented July 9, 1968

3,392,290

BISTABLE DEVICE EMPLOYING TRANSISTORS OF COMPLEMENTARY TYPES

John L. Von Feldt, Apalachin, N.Y., assignor to International Business Machines Corporation, Armonk, N.Y., a corporation of New York Filed July 21, 1965, Ser. No. 473,677
5 Claims. (Cl. 307—288)

This invention relates to improved high speed bistable devices which are capable of driving a load at substantial current levels.

Silicon-controlled rectifiers are frequently used as bistable devices for delivering current to a load at high levels. However, they are characterized by two significant drawbacks, i.e. the anode current must be interrupted to return the rectifier to its nonconductive state, and turn off is comparatively slow.

Transistor pairs connected in the form of a silicon-controlled rectifier suffer from the same drawbacks.

As a result, when the need arises for a high speed, high power bistable device which can be turned off by control pulses, it is typically met by the use of a low power bistable device in conjunction with a separate powering device controlled by the bistable device. Usually a relatively complex and costly circuit is required.

Accordingly, it is the primary object of the present invention to provide a simplified latch which can be turned on and off by control pulses at relatively high speeds and which can deliver current to a load at relatively high levels.

This object is achieved in the illustrated embodiments by the use of a pair of transistors of opposite conductivity types, each having its collector electrode coupled to the base electrode of the other transistor to provide a regenerative loop for bistable operation. As thus far characterized, the circuit configuration resembles that of a transistor equivalent of a silicon-controlled rectifier. However, a diode is interposed between one of the coupled collector and base electrode pairs and is poled to permit regeneration current flow in its low impedance direction. The load is connected to the latter collector electrode.

A bias means is connected to each base electrode and is normally effective to maintain the transistors nonconductive. Set pulses at the base electrode of one transistor turn the transistors on to saturation levels, and reset pulses at the base electrode of the other transistor turn the transistors off. A resistor is provided in the emitter circuit of said one transistor to assure turn off in response to the reset pulses. The diode isolates the set pulses from the load.

This circuit is particularly well adapted for packaging in accordance with monolithic techniques, and it is therefore an object of the present invention to provide an improved bistable device of a monolithic structure.

The foregoing and other objects, features and advantages of the invention will be apparent from the following more particular description of preferred embodiments of the invention, as illustrated in the accompanying drawings.

Figure 1:
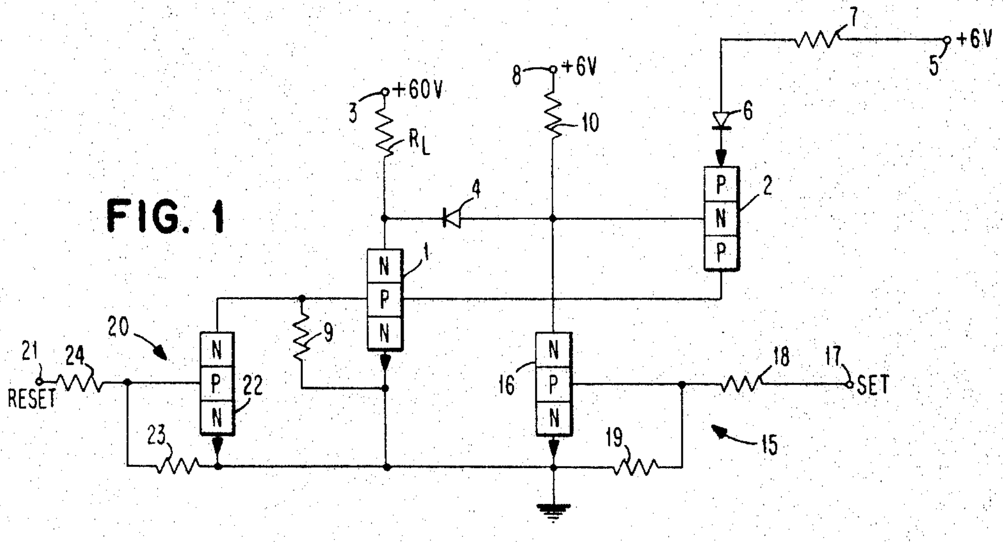
FIG. 1 is a schematic diagram of a preferred form of the improved bistable device.

The improved bistable device of FIG. 1 includes a pair of transistors 1 and 2 of opposite conductivity types. The emitter electrode of the transistor 1 is connected to ground potential and its collector electrode is connected to a positive supply terminal 3 by way of a load impedance $R_L$. The collector electrode of the transistor 1 is also connected to the base electrode of the transistor 2 by way of a diode 4.

The collector electrode of the transistor 2 is connected directly to the base electrode of the transistor 1, and the emitter electrode of the transistor 2 is connected to a positive supply terminal 5 by way of a diode 6 and a resistor 7. The base electrodes of the transistors 1 and 2 are connected respectively to ground potential and to a positive supply terminal 8 by way of resistors 9 and 10, respectively.

An input circuit 15 is provided for turning on the transistors 1 and 2. The circuit 15 includes a transistor 16 having its collector electrode connected directly to the base electrode of the transistor 2 and its emitter electrode connected to ground potential. The base electrode of the transistor 16 is connected to a set input terminal 17 by way of a resistor 18. A level setting resistor 19 is connected between the base and emitter electrodes of the transistor 16.

A reset circuit 20 is provided for turning off the transistors 1 and 2 in response to positive input pulses applied to a reset input terminal 21 and a resistor 24. The reset circuit includes a transistor 22 having its emitter electrode connected to ground potential and its collector electrode connected directly to the base electrode of the transistor 1. A level setting resistor 23 is connected across the base and emitter electrodes of the transistor 22.

In the event that the transistor 2 is germanium, the diode 6 is provided to assure cutoff. If a silicon transistor is used, the diode can be eliminated. The supply terminal 8 and the resistor 10 compensate for the collector leakage current of the transistor 2 and insure that the transistor is in its cutoff state. Similarly, the resistor 9 compensates for the collector leakage current of the transistor 1 and insures its being in the nonconductive state.

The operation of the bistable device will now be described. Assume that the transistors 1 and 2 are nonconducting and that ground potential is applied to the set and reset terminals 17 and 21.

When a positive-going pulse 30 (FIG. 3) is applied to the terminal 17, the transistor 16 is driven to saturation to apply ground potential to the base electrode of the transistor 2. The diode 4 isolates the transistor 16 from the load $R_L$. The transistor 2 turns on and its collector current is applied to the base electrode of the transistor 1 to turn the latter on. The collector current of the transistor 1 is applied to the load $R_L$ and also to the base electrode of the transistor 2 to form a regenerative loop which maintains the transistors 1 and 2 in their conductive states. After a short conditioning time $T_1$ (FIG. 3), the terminal 17 is returned to ground potential to cut off the transistor 16. Power dissipation is minimized by operating transistors 1 and 2 in saturation.

When it is desired to reset the bistable device, a positive-going pulse 31 (FIG. 3) is applied to the reset terminal 21 to drive the transistor 22 to saturation. The transistor 22 applies ground potential to the base electrode of the transistor 1 driving the base electrode voltage below cutoff and interrupting the regenerative loop. When the transistor 22 turns on, the resistor 7 assures a sufficiently low voltage at the base electrode of the transistor 1 to cut the latter off. The transistor 22 is isolated from the load $R_L$ for the turn off function so that turn off power requirements are minimized. With the transistor 1 cut off, the transistor 2 is in turn driven to its nonconductive state since it relies upon the collector current of the transistor 1 for its base current. After the required conditioning time $T_3$ (FIG. 3), ground potential is again applied to the terminal 21 to turn the transistor 22 off.

During the initial turn on of the transistors 1 and 2 in response to a set pulse at the terminal 17, the turn on gain is approximately the product of the current gains of both transistors 1 and 2. As soon as this product of the current gains of the transistors exceeds unity, the regenerative loop becomes self-sustaining and assures full turn on of the transistors to the selected stable state, even though the set ground potential is removed by turning the transistor 16 off. The ground pulse applied to the base electrode of the transistor 2 by the transistor 16 must produce a current which is sufficient in amplitude and time duration merely to bring the transistors 1 and 2 to a level of conduction at which the product of their gains equals or exceeds unity. At this point there is no longer a need for input drive since the regenerative process is self-sustaining. Thus the improved bistable device comprising the transistors 1 and 2 exhibits a low input drive requirement for turn on. Conventional transistor power switches on the other hand, exhibit high input drive requirements.

The turn off gain of the bistable device is approximately that of the current gain of the transistor 1; and, therefore, the turn off gain is similar to that of a comparable power transistor.

Figure 3:
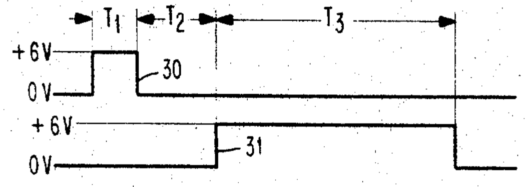
FIG. 3 shows illustrative set and reset input pulses for the embodiment of FIG. 1.

A circuit constructed in accordance with the configuration of FIG. 1 utilizing silicon and germanium for transistors 1 and 2, respectively, and utilizing the following component values provided reliable operation of the load at a 5 ampere level with $T_1$, $T_2$ and $T_3$ of FIG. 3 equal to .15 microsecond, .07 microsecond and 2.5 microseconds, respectively. Higher operating speeds can be obtained so long as high speed transistors are utilized. It will be appreciated that these component values, transistor types, current levels and operating speeds are given merely by way of example. The potential at the terminal 3 must be substantially equal to or greater than the potential at the terminal 5 to prevent the base-emitter junction of the transistor 2 from being biased to its low impedance region of operation.

| Resistors: | Values in ohms |
|---|---|
| $R_L$ | 15 |
| **7** | 10 |
| **9** | 100 |
| **10**, **18** | 1000 |
| **19**, **23** | 10000 |
| **24** | 150 |

Figure 2:
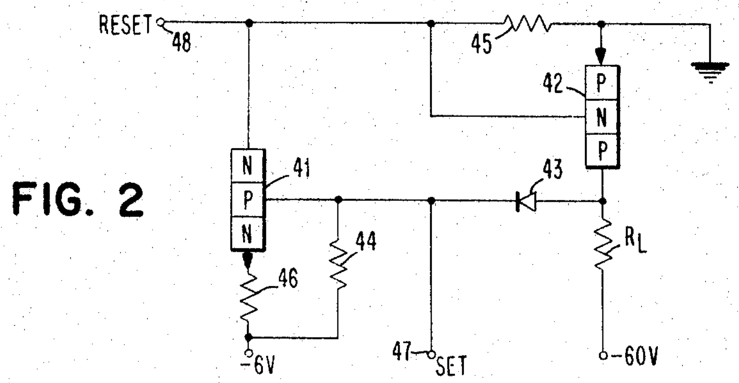
FIG. 2 is a schematic diagram of another form of the improved bistable device.

The embodiment of FIG. 2 is similar to that of FIG. 1 except that the PNP transistor is selected as the power transistor and the load $R_L$ is connected to its collector electrode. This requires the relocation of the diode in the regenerative loop.

The bistable device of FIG. 2 includes a pair of silicon transistors 41 and 42 with their base and collector electrodes cross-coupled. A diode 43 is interposed between the collector and base electrodes of the transistors 42 and 41, respectively. Base bias resistors 44 and 45 are provided for the transverse 41 and 42 and a resistor 46 is included in the emitter circuit of the transistor 41.

The resistors 44, 45 and 46 correspond functionally to the resistors 9, 10 and 7 of FIG. 1, respectively.

Ground potential applied to a set terminal 47 will turn the transistors 41 and 42 on, and ground potential applied to a reset terminal 48 will turn the transistors off.

While the invention has been particularly shown and described with reference to preferred embodiments thereof, it will be understood by those skilled in the art that the foregoing and other changes in form and details may be made therein without departing from the spirit and scope of the invention.

What is claimed is:

1. In a bistable device of the type in which first and second transistors of opposite conductivity types have their collector and base electrodes cross-coupled to form a regenerative loop and have their emitter electrodes connected between the terminals of a power supply for stable operation of both transistors alternatively at cutoff or in saturation; the combination with the transistors of a load impedance having a first end and having a second end connected to the collector electrode of the first transistor;

means connected to the first end of the load impedance normally reverse biasing the collector electrode of the first transistor and inhibiting series current flow through the path including the load impedance and the base-emitter junction of the second transistor;

means normally maintaining the transistors in their cutoff conditions;

set and reset means coupled to the base electrodes of the second and first transistors respectively, and adapted for connection with respective sources of input pulses for turning the transistors on and off respectively;

a resistor interposed between the emitter electrode of the second transistor and its respective power supply terminal for assuring turn off of the transistors in response to pulses applied to the reset means; and a diode, poled in the easy current flow direction, interposed in the regenerative loop between the collector electrode of the first transistor and the base electrode of the second transistor to supply base current to the second transistor from the collector electrode of the first transistor when the latter is conducting, and effective to isolate the set means from the load impedance during turn on of the transistors in response to input pulses applied to the set means.

2. In a bistable device of the type in which first and second transistors of opposite conductivity types have their collector and base electrodes cross-coupled to form a regenerative loop and have their emitter electrodes connected between the terminals of a power supply for stable operation of both transistors alternatively at cutoff or in saturation, the combination with the transistors of a load impedance having a first end and having a second end connected to the collector electrode of the first transistor;

an additional power supply terminal connected to the first end of the load impedance and having a potential applied thereto which has a polarity and level relative to the other power supply terminals which reverse biases the collector electrode of the first transistor and which is in the reverse bias sense with respect to the base-emitter junction of the second transistor and its emitter bias supply terminal;

means coupled to the base electrodes of the transistors normally maintaining the latter in their cutoff conditions;

set and reset transistor switches directly coupled to the base electrodes of the second and first transistors respectively, and adapted for connection with respective sources of input pulses for turning the first and second transistors on and off respectively, a resistor interposed between the emitter electrode of the second transistor and its respective power supply terminal for assuring turn off of the first and second transistors in response to pulses applied to the reset switch, and a diode, poled in the easy current flow direction, interposed in the regenerative loop between the collector electrode of the first transistor and the base electrode of the second transistor to supply base current to the second transistor from the collector electrode of the first transistor when the latter is conducting, and effective to isolate the set switch from the load impedance during turn on of the first and second transistors in response to input pulses applied to the set switch.

3. A bistable device comprising:

first and second transistors of opposite conductivity types, each including base, emitter and collector electrodes;

a power supply including first, second and third terminals at different potential levels, the potential level at the second terminal being intermediate that at the first and third terminals;

the emitter electrode of the first transistor being connected to the first terminal;

a load impedance connected between the third terminal and the collector electrode of the first transistor;

an impedance connecting the emitter electrode of the second transistor to the second terminal;

a diode connecting the collector electrode of the first transistor to the base electrode of the second transistor and poled to supply a portion of the collector current of the first transistor, when it is conducting, as base drive to the base electrode of the second transistor;

the collector electrode of the second transistor being directly connected to the base electrode of the first transistor so that the collector current of the second transistor, when it is conducting, provides the base drive current for the first transistor;

a first impedance means connecting the base electrode of the first transistor to the first terminal and a second impedance means connecting the base electrode of the second transistor to the second terminal normally maintaining the transistors in their cutoff conditions;

means for connecting the first terminal to the base electrode of the second transistor to cause both transistors to turn on; and means for connecting the first terminal to the base electrode of the first transistor to turn both of the transistors off.

4. A bistable device comprising first and second transistors of opposite conductivity types, each including base, emitter and collector electrodes;

a power supply including at least first and second terminals at different potential levels;

the emitter electrode of the first transistor being connected to the first terminal;

a load impedance connected to the collector electrode of the first transistor;

means connecting the power supply to the load impedance to supply a potential to the latter not substantially less than that of the second terminal;

an impedance connecting the emitter electrode of the second transistor to the second terminal;

a diode connecting the collector electrode of the first transistor to the base electrode of the second transistor and poled to supply a portion of the collector current of the first transistor, when it is conducting, as base drive to the base electrode of the second transistor;

the collector electrode of the second transistor being directly connected to the base electrode of the first transistor so that the collector current of the second transistor, when it is conducting, provides the base drive current for the first transistor;

a first impedance means connecting the base electrode of the first transistor to the first terminal and a second impedance means connecting the base electrode of the second transistor to the second terminal normally maintaining the transistors in their cutoff conditions;

a transistor switch for connecting the first terminal to the base electrode of the second transistor to cause both transistors to turn on; and a transistor switch for connecting the first terminal to the base electrode of the first transistor to turn both of the transistors off.

5. A bistable device comprising:

first and second transistors of opposite conductivity types, each including base, emitter and collector electrodes;

a power supply including first, second and third terminals at different potential levels, the potential level at the second terminal being intermediate that at the first and third terminals;

the emitter electrode of the first transistor being connected to the first terminal;

a load impedance connected between the third terminal and the collector electrode of the first transistor;

a second impedance connecting the emitter electrode of the second transistor to the second terminal;

a diode connecting the collector electrode of the first transistor to the base electrode of the second transistor and poled to supply a portion of the collector current of the first transistor, when it is conducting, as base drive to the base electrode of the second transistor;

the collector electrode of the second transistor being directly connected to the base electrode of the first transistor so that the collector current of the second transistor, when it is conducting, provides the base drive current for the first transistor;

a third impedance means connecting the base electrode of the first transistor to the first terminal and a fourth impedance means connecting the base electrode of the second transistor to the second terminal normally maintaining the transistors in their cutoff conditions;

a transistor switch for connecting the first terminal to the base electrode of the second transistor to cause both transistors to turn on;

said diode isolating the switch from the load impedance during turn on of the first and second transistors; and a transistor switch for connecting the first terminal to the base electrode of the first transistor to turn the first and second transistors off, said second impedance effective to assure turn off of the transistors.

No references cited.

ARTHUR GAUSS, *Primary Examiner.*

J. D. FREW, *Assistant Examiner.*